(12) United States Patent
Kameda et al.

(10) Patent No.: US 10,160,140 B2
(45) Date of Patent: Dec. 25, 2018

(54) INTERNAL MIXER

(71) Applicant: KOBE STEEL, LTD., Kobe-shi (JP)

(72) Inventors: Yasuhiro Kameda, Takasago (JP);
Yasuaki Yamane, Takasago (JP);
Kazuo Miyasaka, Takasago (JP);
Kazuhisa Fukutani, Kobe (JP);
Kosuke Higashi, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 84 days.

(21) Appl. No.: 14/912,554

(22) PCT Filed: Aug. 11, 2014

(86) PCT No.: PCT/JP2014/071222
§ 371 (c)(1),
(2) Date: Feb. 17, 2016

(87) PCT Pub. No.: WO2015/025768
PCT Pub. Date: Feb. 26, 2015

(65) Prior Publication Data
US 2016/0200001 A1 Jul. 14, 2016

(30) Foreign Application Priority Data

Aug. 20, 2013 (JP) .................................. 2013-170689

(51) Int. Cl.
*B29B 7/26* (2006.01)
*B29B 7/18* (2006.01)
*B29B 7/24* (2006.01)

(52) U.S. Cl.
CPC .............. *B29B 7/263* (2013.01); *B29B 7/186* (2013.01); *B29B 7/246* (2013.01)

(58) Field of Classification Search
CPC ..................................................... B29B 7/186
(Continued)

(56) References Cited

U.S. PATENT DOCUMENTS 1,623,159 A 4/1927 Brown et al.
2,095,907 A * 10/1937 Beken ................... B01F 7/042
366/298

(Continued)

FOREIGN PATENT DOCUMENTS

DE    807 186        *  6/1951
EP    0 729 816 A1     9/1996
(Continued)

OTHER PUBLICATIONS

International Preliminary Report of Patentability and Written Opinion dated Feb. 23, 2016 in PCT/JP2014/071222 (English translation only).

(Continued)

*Primary Examiner* — David L Sorkin
(74) *Attorney, Agent, or Firm* — Oblon, McClelland, Maier & Neustadt, L.L.P.

(57) ABSTRACT

A sealed kneading machine includes a kneading chamber to which a material to be kneaded is supplied, and a rotor disposed in the kneading chamber to be able to rotate about a rotor shaft. The rotor includes a plurality of kneading blades for kneading the material to be kneaded, and the length of all the kneading blades in the rotor shaft direction of each thereof is 45% or less of the total length of the rotor in the rotor shaft direction.

3 Claims, 6 Drawing Sheets

(58) Field of Classification Search
USPC .................................... 366/76.7, 84, 85, 97
See application file for complete search history.

(56) References Cited

U.S. PATENT DOCUMENTS

| | | |
|---|---|---|
| 5,297,935 A | 3/1994 | Passoni |
| 5,984,516 A | 11/1999 | Inoue et al. |
| 2001/0036123 A1 | 11/2001 | Koro et al. |
| 2006/0104154 A1 | 5/2006 | Inoue et al. |
| 2011/0222364 A1 | 9/2011 | Yoshida et al. |

FOREIGN PATENT DOCUMENTS

| | | |
|---|---|---|
| JP | 06-008235 A | 1/1994 |
| JP | 11-048239 A | 2/1999 |
| JP | 2002-011336 A | 1/2002 |
| JP | 2005-288709 A | 10/2005 |
| JP | 2006-142616 A | 6/2006 |
| JP | 4 568 785 B2 | 10/2010 |
| WO | WO 2007/077046 A1 | 7/2007 |

OTHER PUBLICATIONS

International Search Report dated Sep. 9, 2014 for PCT/JP2014/071222 filed on Aug. 11, 2014.

* cited by examiner

INTERNAL MIXER

TECHNICAL FIELD

The present invention relates to an internal mixer.

BACKGROUND ART

Conventionally, there have been internal mixers (refer to Patent Documents 1 and 2 and the like). An internal mixer includes a mixing chamber to which a mixing material is supplied and a rotor arranged within the mixing chamber. The rotor includes a plurality of mixing blades for mixing the mixing material. By the rotor being rotated, the mixing blade mixes the mixing material.

[Conventional Technique 1] In Patent Document 1 (see FIG. 2 and FIG. 4 of the same document), a technique intended to achieve both distributivity and dispersibility of a mixing material with a non-linear blade (13) is described. In paragraph [0017] of the same document, it is described that the length of a mixing blade (12, 13) in the rotor axis direction is set to 0.65 L or 0.7 L with respect to an entire length (L) of a rotor in the rotor axis direction.

[Conventional Technique 2] In Patent Document 2, a technique intended to obtain a mixed product of a favorable quality by causing the size of a gap (tip clearance) between an apex section of a mixing blade and the inner surface of a mixing chamber to be a predetermined value is described. In paragraph [0035] of the same document, it is described that the length of a mixing blade (13, 14) in the rotor axis direction is set to 0.7 W or 0.65 W with respect to an entire length (W) of a rotor in the rotor axis direction.

In the internal mixers of Conventional Techniques 1 and 2, there is room for improvement in the performance for distribution of a mixing material. When the performance for distribution of a mixing material is low, there is a risk that the mixing time of the mixing material (time required to bring the mixing material to a desired mixed state) increases. Therefore, there is room for improvement in the productivity with the internal mixers of Conventional Techniques 1 and 2.

CITATION LIST

Patent Document

Patent Document 1: Japanese Patent Application Laid-open No. 2002-11336
Patent Document 2: Japanese Patent No. 4568785

SUMMARY OF INVENTION

An object of the present invention is to provide an internal mixer that can improve the performance for distribution of a mixing material, can shorten the mixing time of a mixing material, and can improve the productivity with the internal mixer.

An internal mixer according to one aspect of the present invention includes: a mixing chamber to which a mixing material is supplied; and a rotor arranged within the mixing chamber to be freely rotatable about a rotor axis, wherein the rotor includes a plurality of mixing blades for mixing the mixing material, and each length of all of the mixing blades in a rotor axis direction is 45% or less of an entire length of the rotor in the rotor axis direction.

EMBODIMENTS OF INVENTION

Figure 1:
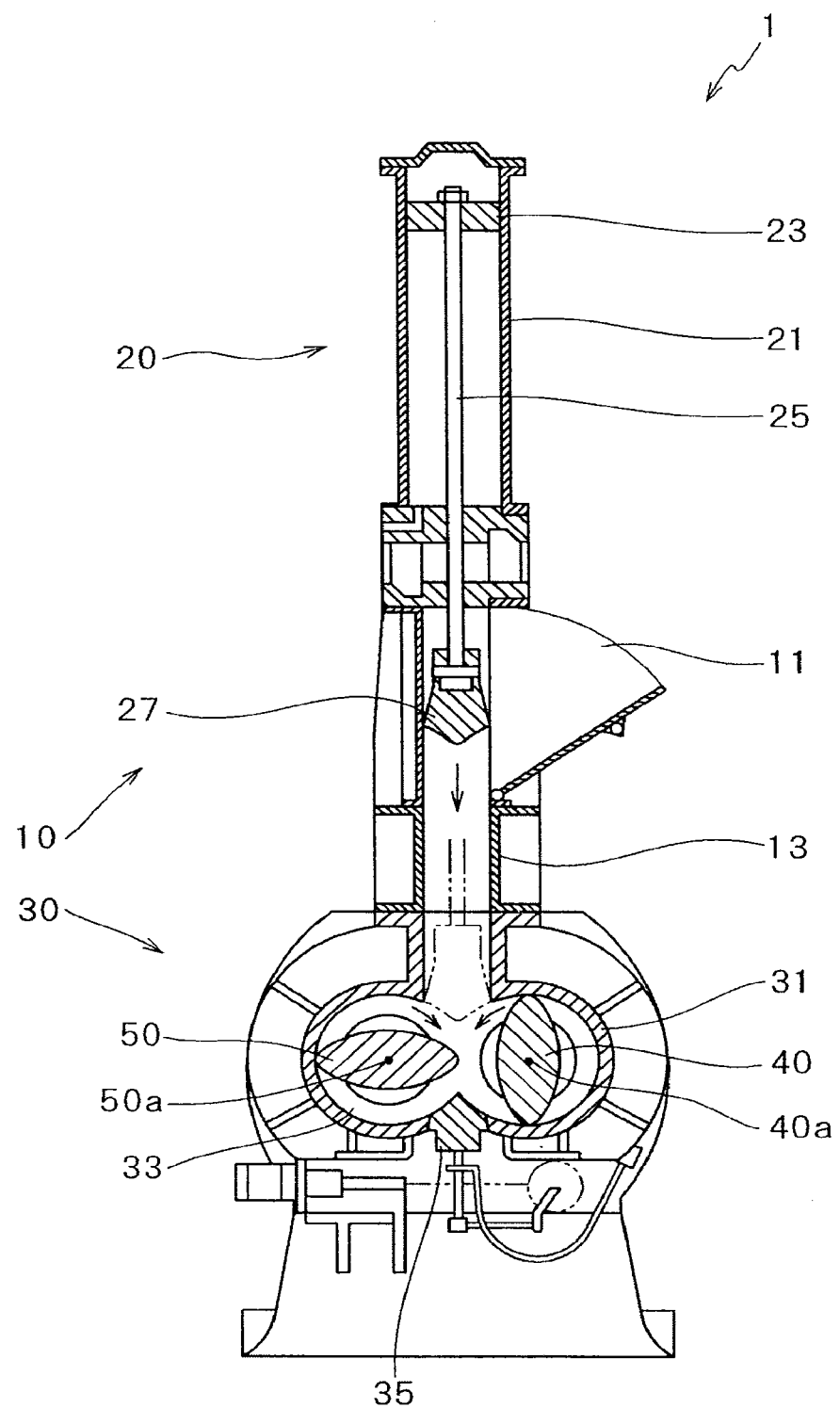
FIG. 1 is a sectional view of an internal mixer 1.

Referring to FIG. 1 to FIG. 6, an internal mixer 1 shown in FIG. 1 will be described.

The internal mixer 1 is a device that performs mixing of a mixing material. The mixing material is, for example, a polymeric material. The polymeric material is, for example, rubber or resin. The mixing material consists of, for example, a combination or the like of silica, silane coupling agent, and the like with rubber. The internal mixer 1 is of a batch type. The internal mixer 1 includes a supply section 10 and a mixing section 30.

The supply section 10 is a section that supplies a mixing material to the mixing section 30. The supply section 10 includes a hopper 11, a material supply cylinder 13, and a cylinder device 20.

A mixing material is put into the hopper 11 from outside the internal mixer 1.

The material supply cylinder 13 is a cylinder through which a mixing material is passable. An upper section of a space in the material supply cylinder 13 communicates with a space in the hopper 11.

The cylinder device 20 is a device that pushes a mixing material into the mixing section 30 (a mixing chamber 33 described later) from the material supply cylinder 13. The cylinder device 20 is a telescopic type actuator. The cylinder device 20 is, for example, a pneumatic type actuator. The cylinder device 20 is arranged above the material supply cylinder 13. The cylinder device 20 includes a cylinder 21, a piston 23, a piston rod 25, and a floating weight 27.

The cylinder 21 is a cylinder-shaped member. The piston 23 is a member capable of a reciprocating motion within the cylinder 21.

The piston rod 25 is a rod coupled to the piston 23. The piston rod 25 penetrates a bottom lid of the cylinder 21 (portion of a lid at the lower end of the cylinder 21) in an airtight manner.

The floating weight 27 is a member that pushes a mixing material to the mixing section 30 side (to the lower side) from the supply section 10. The floating weight 27 is arranged within the material supply cylinder 13. The floating weight 27 is coupled to the piston rod 25. The floating weight 27 is freely movable in the axis direction (vertical direction) of the material supply cylinder 13.

The mixing section 30 is a portion that mixes a mixing material. The mixing section 30 is arranged beneath the supply section 10 and coupled to the supply section 10. The mixing section 30 includes a chamber 31, a drop door 35, and rotors 40 and 50.

The chamber 31 is a portion inside which the mixing chamber 33 is formed. At an upper section of the chamber 31, an upper section supply opening for communication of a lower section of the space in the material supply cylinder 13 and the mixing chamber 33 is formed. At a bottom section of the chamber 31, a bottom section discharge opening for communication of the outside of the internal mixer 1 and the mixing chamber 33 is formed.

The mixing chamber 33 is a space (segment) to which a mixing material is supplied. The mixing chamber 33 is a space in which a mixing material is mixed. The vertical sectional surface of the mixing chamber 33 is of a cocoon shape. The vertical sectional surface corresponds to a sectional surface when seen from a rotor axis direction Z (see FIG. 2) described later.

The drop door 35 opens and closes (opens and shuts) the bottom section discharge opening of the chamber 31. The drop door 35 opens and closes the bottom section discharge opening by being driven by an actuator. The actuator that drives the drop door 35 is, for example, a rotating type actuator (rotary actuator) or the like.

Figure 3:
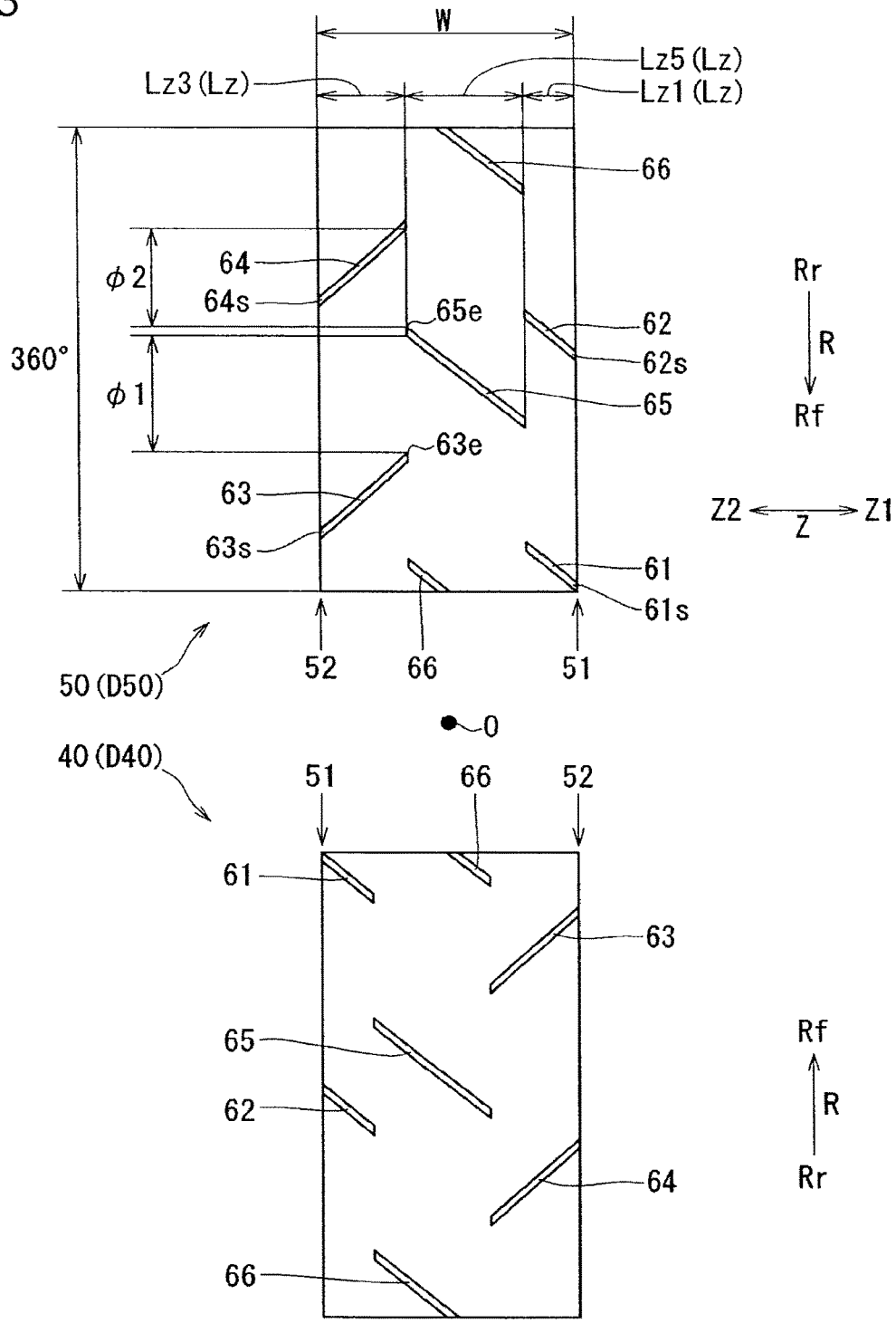
FIG. 3 is a development view of a rotor 40 and the rotor 50 shown in FIG. 1.

The rotors 40 and 50 (mixing rotors) are arranged within the mixing chamber 33. Each rotors 40 and 50 has an approximately cylindrical shape. The two rotors 40 and 50 are arranged within the mixing chamber 33. That is, the internal mixer 1 is of a biaxial type. The central axis of the rotor 40 (central axis of an approximate cylinder) corresponds to a rotor axis 40a of the rotor 40. The central axis of the rotor 50 (central axis of an approximate cylinder) corresponds to a rotor axis 50a of the rotor 50. As shown in FIG. 3, the rotor 40 and the rotor 50 each include mixing blades 61 to 66.

The two rotors 40 and 50 are provided as a left and right pair, so to speak. As shown in FIG. 1, the rotor 40 and the rotor 50 are arranged such that the rotor axis 40a and the rotor axis 50a are parallel. The rotor axis 40a and the rotor axis 50a are arranged on the same plane parallel to the horizontal plane. The rotor 40 and the rotor 50 are arranged with an interval in between. Note that the number of the rotor included in the internal mixer 1 may be only one. That is, the internal mixer 1 may be of a uniaxial type. Hereinafter, a case where the internal mixer 1 includes the two rotors 40 and 50 will be described.

The two rotors 40 and 50 rotate in directions different from each other, such that inside portions of the rotors 40 and 50 move downward. The inside portions of the rotors 40 and 50 correspond to portions of the rotors 40 and 50 located between the rotor axis 40a and the rotor axis 50a. The rotor 40 is freely rotatable about the rotor axis 40a. The rotor 50 is freely rotatable about the rotor axis 50a.

The respective mixing blades 61 to 66 of the two rotors 40 and 50 do not mesh with each other. That is, the internal mixer 1 is of a non-meshing type.

The development shapes of the two rotors 40 and 50 are point symmetric with each other, as shown in FIG. 3. More specifically, the shape of the rotor 40 upon development around the rotor axis 40a (see FIG. 1) of the rotor 40 is a development shape D40, and the shape of the rotor 50 upon development around the rotor axis 50a (see FIG. 1) of the rotor 50 is a development shape D50. Then, the development shape D40 and the development shape D50 are point symmetric with each other with respect to a center point 0. The arrangement of the mixing blades 61 to 66 in the development shape D40 and the arrangement of the mixing blades 61 to 66 in the development shape D50 are point symmetric with each other with respect to the center point O. Hereinafter, only one rotor 50 out of the two rotors 40 and 50 will be described, and description of the rotor 40 will be omitted.

Figure 2:
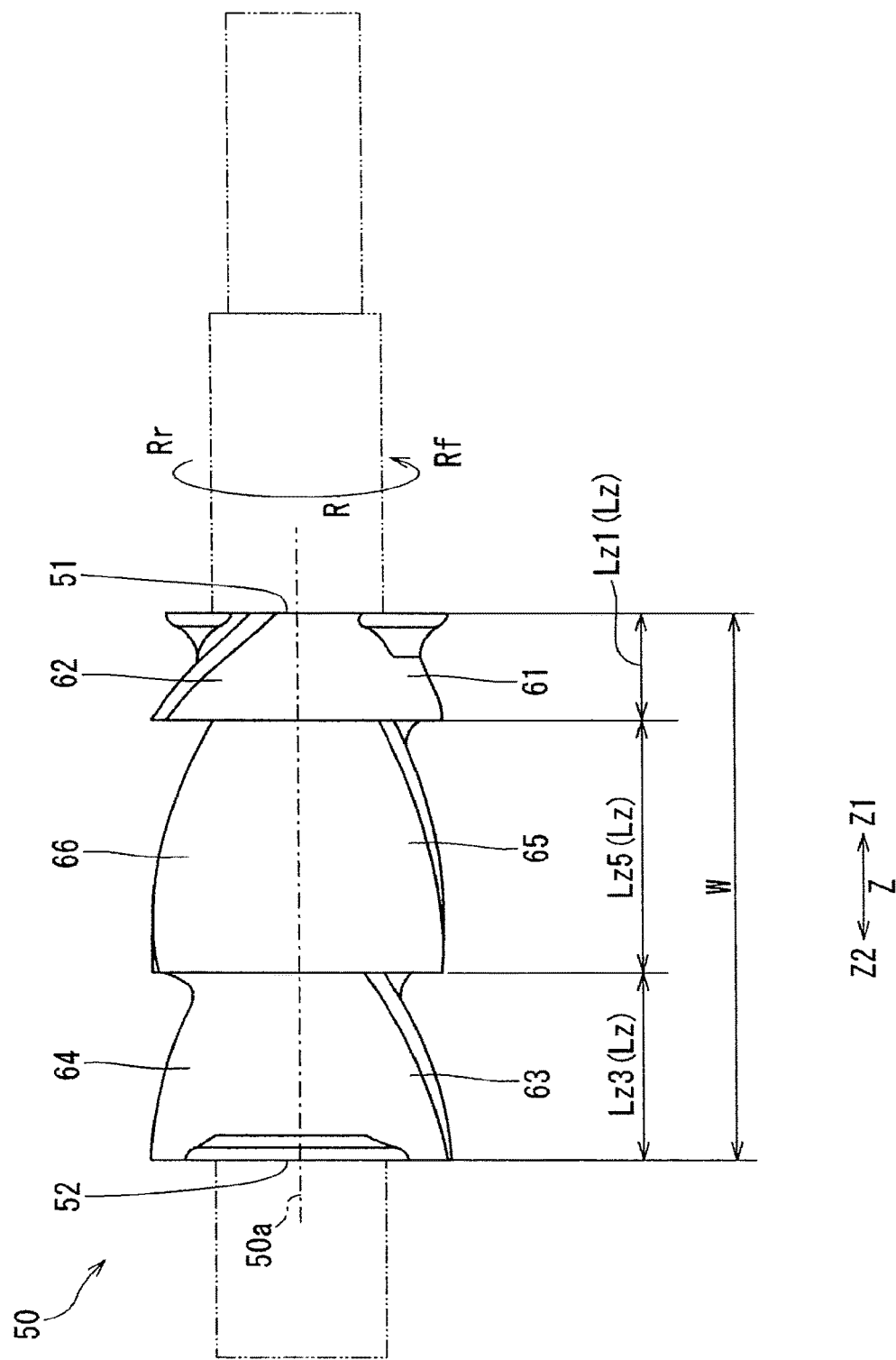
FIG. 2 is an overall view of a rotor 50 shown in FIG. 1.

Herein, the direction and position relating to the rotor 50 are defined as follows. The rotating direction of the rotor 50 shown in FIG. 2 is a rotor rotating direction R. That is, a direction around the rotor axis 50a and a circumferential direction of the approximately cylinder-shaped rotor 50 are the rotor rotating direction R. In the rotor rotating direction R, the front side upon rotation of the rotor 50 is a front side Rf, and the rear side upon rotation of the rotor 50 is a rear side Rr. An extension direction of the rotor axis 50a of the rotor 50 is the rotor axis direction Z. One side in the rotor axis direction Z is a first axis end side Z1. The other side in the rotor axis direction Z is a second axis end side Z2. That is, an opposite side of the first axis end side Z1 in the rotor axis direction Z is the second axis end side Z2. The entire length of the rotor 50 in the rotor axis direction Z is an entire length W. In the rotor 50, there are a first axis end 51 and a second axis end 52.

The first axis end 51 is one end section of the rotor 50 in the rotor axis direction Z. The first axis end 51 is an end section of the rotor 50 on the first axis end side Z1.

The second axis end 52 is the other end section of the rotor 50 in the rotor axis direction Z. The second axis end 52 is an end section of the rotor 50 on the second axis end side Z2. That is, the second axis end 52 is an end section on an opposite side of the first axis end 51 in the rotor axis direction Z.

The mixing blades 61 to 66 are blades (wings) for mixing a mixing material. The rotor 50 is provided with a plurality of the mixing blades 61 to 66. Specifically, the number of the mixing blades 61 to 66 of one rotor 50 is six. The number of the mixing blades 61 to 66 of one rotor 50 may be 7 or greater and 5 or less (not shown in the drawing).

The mixing blades 61 to 66 are configured such that gaps (tip clearances) are formed between the inner surface of the chamber 31 and apex sections of the mixing blades 61 to 66, the inner surface surrounding the mixing chamber 33 (see FIG. 1). The apex sections are tip end sections of the mixing blades 61 to 66. The tip end sections of the mixing blades 61 to 66 are outside end sections of the mixing blades 61 to 66 in the diameter direction of the approximately cylinder-shaped rotor 50. The mixing blades 61 to 66 are configured to give a shear force to a mixing material that passes through the tip clearance at the time of rotation of the rotor 50. The mixing blades 61 to 66 are configured to push a mixing material at the time of rotation of the rotor 50, so that the mixing material moves (flows) in the rotor axis direction Z. The mixing blades 61 to 66 are of a shape twisted in a spiral manner with the rotor axis 50a as the central axis. The apex section of the mixing blades 61 to 66 is spiral-shaped with the rotor axis 50a as the central axis. As shown in FIG. 3, (all of) the mixing blades 61 to 66 are linear blades. A linear blade is a blade that is linear (linear-shaped) in the development shape D50 of the rotor 50. Note that at least a part of the mixing blades 61 to 66 may be a non-linear blade (not shown in the drawing).

(Length Lz of Mixing Blades 61 to 66 in Rotor Axis Direction Z)

As shown in FIG. 2, a length Lz of all mixing blades 61 to 66 in the rotor axis direction Z is 45% or less of the entire length W of the rotor 50 ($Lz \leq 0.45$ W) in the rotor axis direction Z. A length Lz1 of the respective mixing blades 61 and 62 is 45% or less of the entire length W. A length Lz3 of the respective mixing blades 63 and 64 is 45% or less of the entire length W. A length Lz5 of the respective mixing blades 65 and 66 is 45% or less of the entire length W.

(Position of Mixing Blades 61 to 66 with Respect to Axis End)

In the plurality of mixing blades 61 to 66, there are blades whose starting points (described later) are arranged at axis ends (the first axis end 51 and the second axis end 52) different from each other. Specifically, as shown in FIG. 3, there are first axis end side blades (the mixing blades 61 and 62) and second axis end side blades (the mixing blades 63 and 64) in the plurality of mixing blades 61 to 66. Also, in the plurality of mixing blades 61 to 66, there are middle blades (the mixing blades 65 and 66) not in contact with either the first axis end 51 or the second axis end 52.

The first axis end side blades (mixing blades 61 and 62) are blades whose end sections (starting points 61s and 62s) on the front side Rf in the rotor rotating direction R are arranged at the first axis end 51. The first axis end side blades (mixing blades 61 and 62) are blades that feed a mixing material to the second axis end side Z2 from the first axis end 51 at the time of rotation of the rotor 50. A plurality (two or more) of the first axis end side blades (mixing blades 61 and 62) are provided. For example, the two first axis end side blades are provided. The lengths Lz1 of the two first axis end side blades (mixing blades 61 and 62) are identical with each other. In the development shape D50, the angles of the two first axis end side blades (mixing blades 61 and 62) with respect to the rotor rotating direction R are identical with each other. The same applies for the two second axis end side blades (mixing blades 63 and 64) and the two middle blades (mixing blades 65 and 66).

The second axis end side blades (mixing blades 63 and 64) are blades whose end sections (starting points 63s and 64s) on the front side Rf in the rotor rotating direction R are arranged at the second axis end 52. The second axis end side blades (mixing blades 63 and 64) feed a mixing material to the first axis end side Z1 from the second axis end 52 at the time of rotation of the rotor 50. A plurality of the second axis end side blades (mixing blades 63 and 64) are provided. For example, two are provided. The lengths Lz3 of the two second axis end side blades (mixing blades 63 and 64) are identical with each other.

The middle blades (mixing blades 65 and 66) are arranged only on the second axis end side Z2 relative to the first axis end 51 and arranged only on the first axis end side Z1 relative to the second axis end 52. The middle blades (mixing blades 65 and 66) are arranged on the second axis end side Z2 of the first axis end side blades (mixing blades 61 and 62). The middle blades (mixing blades 65 and 66) are arranged on the first axis end side Z1 of the second axis end side blades (mixing blades 63 and 64). The middle blades (mixing blades 65 and 66) feed a mixing material to the second axis end side Z2 toward the second axis end side blades (mixing blades 63 and 64) from the first axis end side blades (mixing blades 61 and 62) at the time of rotation of the rotor 50. Note that the middle blades (mixing blades 65 and 66) may be configured to feed a mixing material to the first axis end side Z1 at the time of rotation of the rotor 50 (not shown in the drawing). A plurality of the middle blades (mixing blades 65 and 66) are provided. For example, the two middle blades are provided. The lengths Lz5 of the two middle blades (mixing blades 65 and 66) are identical with each other.

(Type of Length Lz of Mixing Blades 61 to 66)

In the plurality of mixing blades 61 to 66, there are blades whose lengths Lz are different from each other. The plurality of mixing blades 61 to 66 include a short blade and a long blade whose length Lz is greater than the length of the short blade. The length Lz5 of the middle blades (mixing blades 65 and 66) is greater than the length Lz1 of the first axis end side blades (mixing blades 61 and 62) and greater than the length Lz3 of the second axis end side blades (mixing blades 63 and 64). The length Lz3 of the second axis end side blades (mixing blades 63 and 64) is greater than the length Lz1 of the first axis end side blades (mixing blades 61 and 62).

A plurality of the short blades (e.g., mixing blades 61 and 62) are provided. For example, the two short blades are provided. A plurality of the long blades (e.g., mixing blades 63 and 64) are provided. For example, the two long blades are provided.

(Interval of Mixing Blades 61 to 66 in Rotor Rotating Direction R)

The plurality of mixing blades 61 to 66 are arranged with an interval (space) in between from each other in the rotor rotating direction R. Specifically, there are a front blade and a rear blade in the plurality of mixing blades 61 to 66.

The front blade is the mixing blade 63. The front blade (mixing blade 63) includes a front blade end point 63e. The front blade end point 63e is a rear side Rr end section of the front blade (mixing blade 63) in the rotor rotating direction R.

The rear blade (mixing blade 65) is adjacent to the front blade end point 63e on the rear side Rr (immediately in the rear). The rear blade (mixing blade 65) and the front blade end point 63e are arranged with an interval $\phi1$ in between from each other in the rotor rotating direction R. Specifically, the interval $\phi1$ is given between the front blade end point 63e and a portion of the rear blade (mixing blade 65) which is located immediately in the rear of the front blade end point 63e in the rotor rotating direction R. The size of the interval 41 corresponds to a predetermined phase difference around the rotor axis 50a (see FIG. 2) within a range of 40° to 160°. In other word, the size of the interval $\phi1$ corresponds to a predetermined phase difference around the rotor axis 50a which is 40° or greater and 160° or less.

Note that, when the front blade is the mixing blade 65, the rear blade is the mixing blade 64. In this case, the front blade (mixing blade 65) includes a front blade end point 65e. The front blade end point 65e is a rear side Rr end section of the front blade (mixing blade 65) in the rotor rotating direction R. The rear blade (mixing blade 64) is adjacent to a front blade end point 65e on the rear side Rr (immediately in the rear). The rear blade (mixing blade 64) and the front blade end point 65e are arranged with an Interval $\phi2$ in between from each other in the rotor rotating direction R. Specifically, the interval $\phi2$ is given between the front blade end point 65e and a portion of the rear blade (mixing blade 64) which is located immediately in the rear of the front blade end point 65e in the rotor rotating direction R. The interval 02 between the rear blade (mixing blade 64) and the front blade end point 65e in the rotor rotating direction R corresponds to a predetermined phase difference around the rotor axis 50a (see FIG. 2) within a range of 40° to 160°. Such a condition in phase difference holds among all mixing blades 61 to 66, for example.

(Operation)

The operation of the internal mixer 1 shown in FIG. 1 is as in the following (a) to (h). (a) The drop door 35 is caused to firmly contact the chamber 31. As a result, the bottom section discharge opening of the chamber 31 is closed. (b) A lower section of the cylinder 21 is applied with pressure. As a result, the floating weight 27 moves (ascends) to the supply section 10 side from the chamber 31. As a result, the upper section supply opening of the chamber 31 is opened. (c) A mixing material is supplied into the material supply cylinder 13 via the hopper 11 from outside the internal mixer 1. (d) An upper section of the cylinder 21 is applied with pressure. As a result, the floating weight 27 moves (descends) to the mixing section 30 side. As a result, the mixing material is pushed (loaded or injected) into the mixing chamber 33 from within the material supply cylinder 13. (e) The upper section supply opening of the chamber 31 is closed by the floating weight 27. (f) The rotors 40 and 50 rotate in opposite directions from each other. As a result, a shear force is applied to the mixing material when the mixing material passes through the gaps (tip clearances) between the inner surface of the chamber 31 and the apex sections of the mixing blades 61 to 66 (see FIG. 2). Also, by being pushed by the mixing blades 61 to 66 (see FIG. 2), the mixing material moves in the rotor axis direction Z. Also, the mixing material moves between the two rotors 40 and 50. As a result of these, the mixing material is dispersed uniformly. (g) When mixing of the mixing material is performed for a predetermined time, the mixing material comes to a desired mixed state. (h) The drop door 35 is detached (isolated) from the chamber 31. As a result, the bottom section discharge opening of the chamber 31 is opened. As a result, a mixed product (mixed mixing material) is discharged outside the internal mixer 1.

(Experiment 1)

For the mixing blades 61 to 66 shown in FIG. 2 and mixing blades (61 to 66) of a comparative example, the distribution performance (degree of dispersion of a component within a mixing material) was examined.

The mixing blades (61 to 66) used in the evaluation of the distribution performance are as in the following (A) to (C).

(A: [Conventional Technique 1]) (Comparative example) Mixing blade described in Conventional Technique 1 (Japanese Patent Application Laid-open No. 2002-11336) described above. In the mixing blade of Conventional Technique 1, there are one non-linear blade and three linear blades per one rotor. In the mixing blade of Conventional Technique 1, as described in paragraph [0017] of Patent Document 1, there is a linear blade whose length Lz in the rotor axis direction Z is 70% of the entire length W of the rotor. Also, in the rotor of Conventional Technique 1, there is the non-linear blade whose length Lz is 65% of the entire length W.

(B: [49%]) (Comparative example) That in which the maximum value of the length Lz of the plurality of mixing blades (61 to 66) is 49% of the entire length W. All mixing blades (61 to 66) are linear blades.

(C) Three types of the mixing blades 61 to 66 in the following (C1) to (C3).

(C1: [45%]) That in which the maximum value of the length Lz of the plurality of mixing blades 61 to 66 is 45% of the entire length W.

(C2: [43%]) That in which the maximum value of the length Lz of the plurality of mixing blades 61 to 66 is 43% of the entire length W.

(C3: [40%]) That in which the maximum value of the length Lz of the plurality of mixing blades 61 to 66 is 40% of the entire length W.

The three types of mixing blades 61 to 66 of (C1), (C2), and (C3) described above are all linear blades.

A mixing material is that in which beads are put into a 30% aqueous solution of carboxymethyl cellulose (CMC).

The evaluation of the distribution performance was performed based on a vulcanization measurement with Curemeter "FDR (registered trademark)" VR-3110 Series manufactured by Ueshima Seisakusho Co., Ltd. Note that the internal mixer 1 used in Experiment 1 is that (machine for experiment) simulating a real machine.

Figure 4:
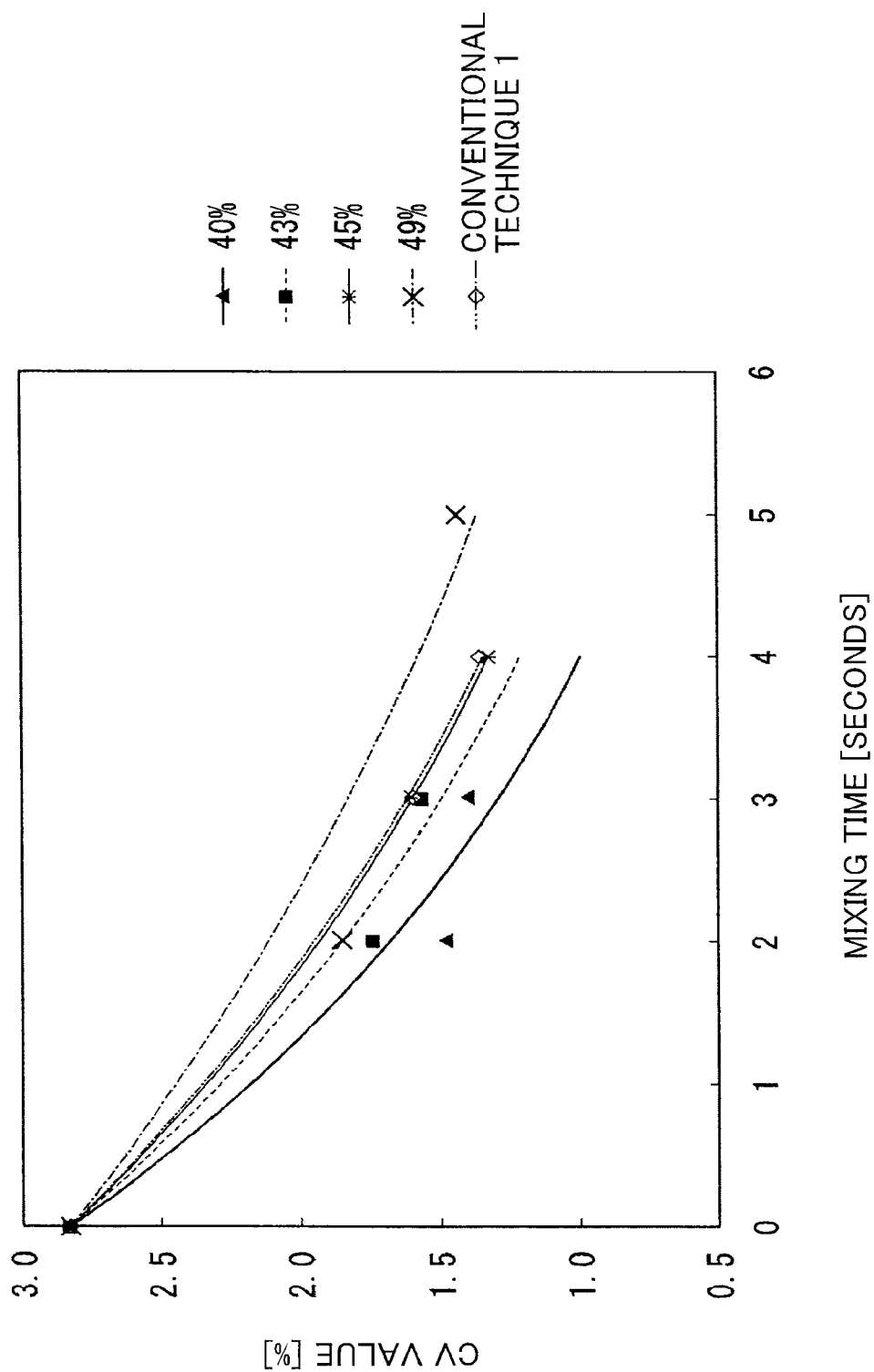
FIG. 4 is a graph showing the relationship of the mixing time and the CV value.
Figure 5:
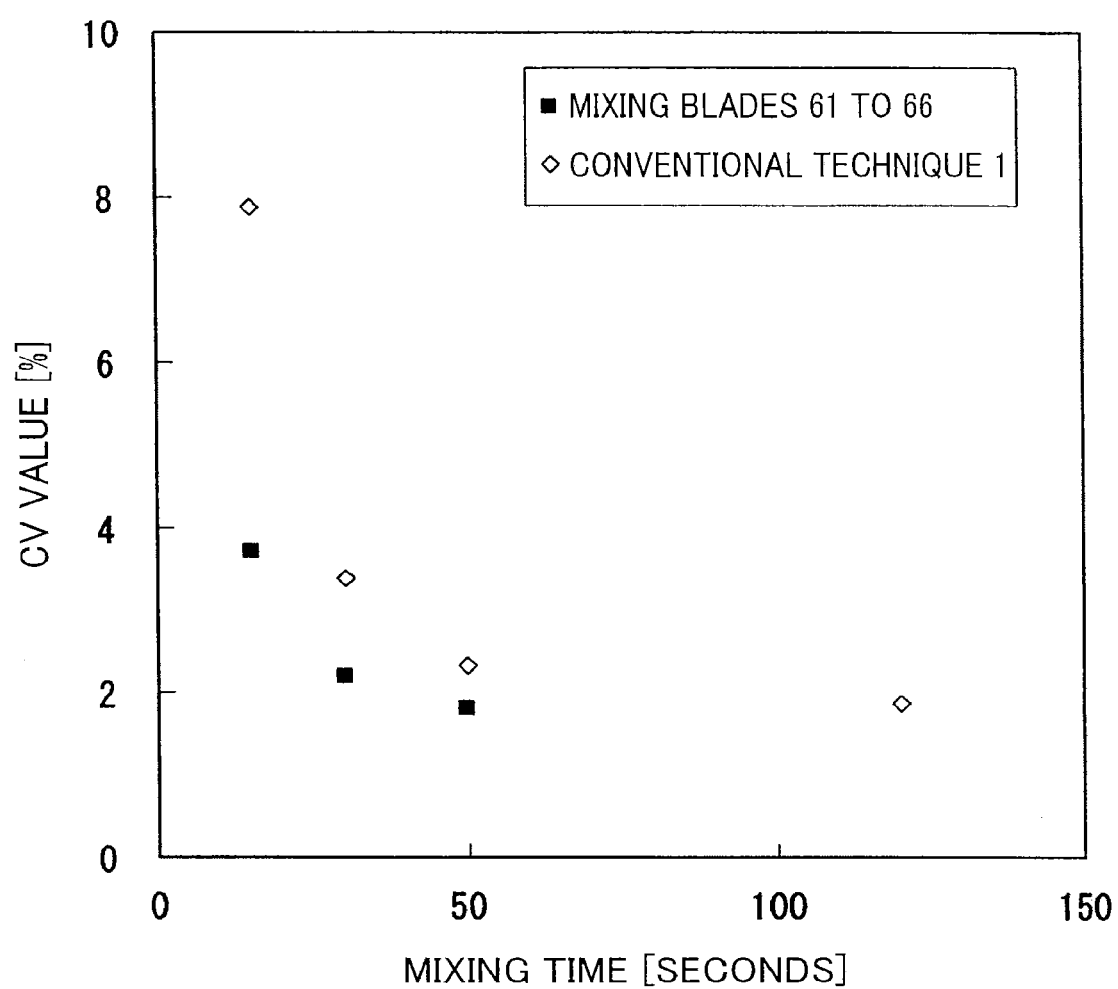
FIG. 5 is a graph showing the relationship of the mixing time and the CV value.
Figure 6:
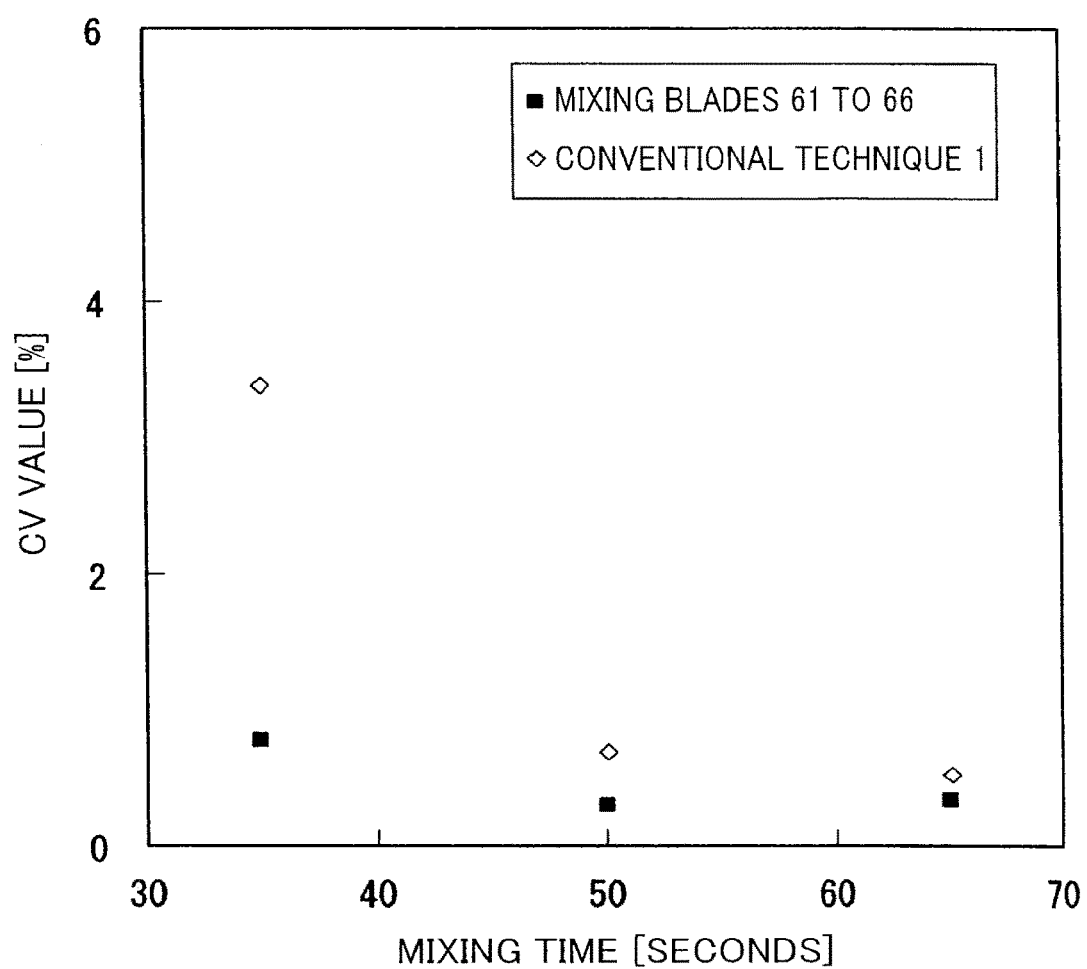
FIG. 6 is a graph showing the relationship of the mixing time and the CV value.

The result of evaluation of the distribution performance is shown in FIG. 4. FIG. 4 is a graph showing the relationship of the mixing time (abscissa) and the CV value (ordinate). FIG. 5 and FIG. 6 are graphs showing the relationship of the mixing time and the CV value as well. CV stands for coefficient of variation. Details of the CV value will be described later. As shown in the graph of FIG. 4, it was found that the mixing performance improves in the case where the length Lz of all mixing blades 61 to 66 is 45% or less of the entire length W of the rotors 40 and 50 relative to a case of Conventional Technique 1 or (B: [49%]) described above. Also, the distribution performance improved when the length Lz with respect to the entire length W is shorter. Specifically, it was found that the distribution performance improved in the order of (C1: [45%]), (C2, [43%], and (C3: [40%]).

The CV value is a value as an index representing the degree of dispersion of a component in a mixing material. A lower CV value represents that the dispersion is progressing (in other words, mixing of a mixing material is being accelerated). The CV value is obtained with the following expression (1).

$$CV = \rho/M \quad (1)$$

In the expression (1), CV is the CV value. In the expression (1), M is an average value of the mass fraction of a component within a mixing material accommodated within the mixing chamber 33 (see FIG. 1). In the expression (1), $\rho$ is the standard deviation of the mass fraction of the component within the mixing material accommodated within the mixing chamber 33.

(Experiment 2)

The distribution performances of the mixing blades 61 to 66 whose length Lz shown in FIG. 2 is 45% or less of the entire length W and the distribution performance of the mixing blade of "(A: [Conventional Technique 1])" described above were compared.

The combination content of a mixing material is as in Table 1.

TABLE 1

| Component | PHR |
| --- | --- |
| SBR | 96.25 |
| BR | 30 |
| Carbon | 85 |
| Alternative aroma oil | 20 |
| Zinc oxide | 3 |
| Stearic acid | 2 |
| Antioxidant | 1 |
| Sulfur | 1.5 |
| Vulcanization accelerator | 1.2 |

The PHR (parts per hundred rubber) in Table 1 is the parts by weight of various compounding agents with respect to a rubber weight of 100. The SBR is styrene-butadiene rubber. The BR is butadiene rubber.

The result of evaluation of the distribution performance is shown in FIG. 5 and FIG. 6. From these graphs, it was found that the distribution performance can be improved particularly in the initial period of mixing (less than 50 seconds or the like in mixing time) with the mixing blades 61 to 66 whose length Lz is 45% or less of the entire length W, compared to Conventional Technique 1.

(Effect 1)

An effect of the internal mixer 1 shown in FIG. 1 will be described. The internal mixer 1 includes the mixing chamber 33 to which a mixing material is supplied and the rotor 50 arranged within the mixing chamber 33 to be freely rotatable about the rotor axis 50*a*. As shown in FIG. 2, the rotor 50 includes the plurality of mixing blades 61 to 66 for mixing a mixing material.

[Configuration 1] A length Lz of all of the mixing blades 61 to 66 in the rotor axis direction Z is 45% or less of the entire length W of the rotor 50 in the rotor axis direction Z.

With the mixing blades 61 to 66 of [Configuration 1] described above, the distribution performance can be improved (see Experiment 1 and Experiment 2 described above) relative to Conventional Technique 1 or the like described above (Conventional Technique 1 and that whose length Lz exceeds 45% with respect to the entire length W). Thus, with the internal mixer 1, a mixing material can be brought to a desired mixed state in less time than in Conventional Technique 1 or the like. As a result, the mixing time (mixing time) of a mixing material can be shortened. As a result, the productivity with the internal mixer 1 can be improved relative to Conventional Technique 1 or the like.

(Effect 2)

[Configuration 2-1] The plurality of mixing blades 61 to 66 include a short blade (e.g., the mixing blades 61 and 62) and a long blade (e.g., the mixing blades 63 and 64) whose length Lz in the rotor axis direction Z is greater than the length of the short blade (e.g., mixing blades 61 and 62) in the rotor axis direction Z.

[Configuration 2-2] Two or more of the short blades (e.g., mixing blades 61 and 62) are provided. Two or more of the long blades (e.g., mixing blades 63 and 64) are provided.

With [Configuration 2-1] described above, the flow of a mixing material is complicated compared to a case where there is only one type of the length Lz of the plurality of mixing blades 61 to 66. Further, with [Configuration 2-2] described above, the flow of a mixing material is complicated compared to a case where only one short blade (e.g., the mixing blade 61 or 62) is provided or a case where only one long blade (e.g., the mixing blade 63 or 64) is provided. Thus, the performance for distribution of a mixing material can further be improved. As a result, the mixing time of a mixing material can be shortened. As a result, the productivity with the internal mixer 1 can be further improved.

(Effect 3)

The rotor 50 includes the first axis end 51 that is one end section of the rotor 50 in the rotor axis direction Z and the second axis end 52 that is the other end section of the rotor 50 in the rotor axis direction Z. As shown in FIG. 3, there are the first axis end side blades (mixing blades 61 and 62) and the second axis end side blades (mixing blades 63 and 64) in the plurality of mixing blades 61 to 66.

[Configuration 3-1] The first axis end side blades (mixing blades 61 and 62) are blades whose front end sections (front side Rf end sections, starting points 61s and 62s) in the rotor rotating direction R are arranged at the first axis end 51.

[Configuration 3-2] The second axis end side blades (mixing blades 63 and 64) are blades whose front end sections (front side Rf end sections, starting points 63s and 64s) in the rotor rotating direction R are arranged at the second axis end 52.

With the first axis end side blades (mixing blades 61 and 62) of [Configuration 3-1] described above, a mixing material moves to the second axis end side Z2 from the first axis end 51. Also, with the second axis end side blades (mixing blades 63 and 64) of [Configuration 3-2] described above, a mixing material moves to the first axis end side Z1 from the second axis end 52. Thus, material residue (remnant of the mixing material) at the first axis end 51 and the second axis end 52 can be prevented.

(Effect 4)

The rotor 50 includes the first axis end 51 and the second axis end 52.

[Configuration 4] In the plurality of mixing blades 61 to 66, there are the middle blades (mixing blades 65 and 66) arranged only on the second axis end side Z2 relative to the first axis end 51 and arranged only on the first axis end side Z1 relative to the second axis end 52.

With [Configuration 4] described above, the flow of a mixing material is complicated compared to a case where the middle blades (mixing blades 65 and 66) are absent. Thus, the performance for distribution of a mixing material can be improved. As a result, the mixing time of a mixing material can further be shortened. As a result, the productivity with the internal mixer 1 can be further improved.

(Effect 5)

In the plurality of mixing blades 61 to 66, there are the front blade (e.g., mixing blade 63) and the rear blade (e.g., mixing blade 65). The rear blade (mixing blade 65) is adjacent, on the rear side Rr in the rotor rotating direction R, to the front blade end point 63e that is a rear end section of the front blade (mixing blade 63) in the rotor rotating direction R.

[Configuration 5] The front blade end point 63e and the rear blade (mixing blade 65) are arranged with an interval $\phi 1$ in between from each other in the rotor rotating direction R. The size of the interval $\phi 1$ corresponds to a predetermined phase difference around the rotor axis 50a (see FIG. 2) within a range of 40° to 160°.

With [Configuration 5] described above, a space between the front blade end point 63e and the rear blade (mixing blade 65) is ensured. Thus, compared to a case where the phase difference of the interval $\phi 1$ is less than 40°, the flow of a mixing material in the space can be accelerated. Also, compared to a case where the phase difference of the interval $\phi 1$ exceeds 160°, the flow of a mixing material becoming too simple can be prevented. In the case where the number of the rotors 40 and 50 is two, the delivery of a mixing material between the rotors 40 and 50 can be accelerated, compared to a case where the phase difference of the interval $\phi 1$ is less than 40°.

(Other Effects)

[Configuration 6] The development shape of all mixing blades 61 to 66 is linear.

With [Configuration 6] described above, the mixing blades 61 to 66 can be made easily, compared to a case where the development shape of at least a part of the mixing blades 61 to 66 is non-linear (see Conventional Technique 1 described above). Nevertheless, as in (Effect 1) described above, the performance for distribution of a mixing material can be improved compared to Conventional Technique 1.

[Summary of Embodiment]

The above embodiment is summarized as follows.

The internal mixer according to the above embodiment includes: a mixing chamber to which a mixing material is supplied; and a rotor arranged within the mixing chamber to be freely rotatable about a rotor axis. The rotor includes a plurality of mixing blades for mixing the mixing material, and each length of all of the mixing blades in a rotor axis direction is 45% or less of an entire length of the rotor in the rotor axis direction.

In the internal mixer, it is preferable that the plurality of mixing blades include: two or more of short blades; and two or more of long blades, wherein any of respective lengths of the long blades in the rotor axis direction is greater than any of respective lengths of the short blades in the rotor axis direction.

In the internal mixer, it is preferable that the rotor includes: a first axis end that is one end section of the rotor in the rotor axis direction; and a second axis end that is another end section of the rotor in the rotor axis direction, and the plurality of mixing blades include: a first axis end side blade whose front end section in a rotating direction of the rotor is arranged at the first axis end; and a second axis end side blade whose front end section in the rotating direction of the rotor is arranged at the second axis end.

In the internal mixer, it is preferable that the rotor includes: a first axis end that is one end section of the rotor in the rotor axis direction; and a second axis end that is another end section of the rotor in the rotor axis direction, and the plurality of mixing blades include a middle blade arranged only on the second axis end side relative to the first axis end and arranged only on the first axis end side relative to the second axis end.

In the internal mixer, it is preferable that the plurality of mixing blades include: a front blade; and a rear blade adjacent, on a rear side in a rotating direction of the rotor, to a front blade end point that is a rear end section of the front blade in the rotating direction of the rotor, the front blade end point and the rear blade are spaced in the rotating direction of the rotor, and a size of an interval between the front blade end point and the rear blade corresponds to a predetermined phase difference around the rotor axis within a range of 40° to 160°.

According to the embodiment, the performance for distribution of a mixing material can be improved, the mixing time of a mixing material can be shortened, and the productivity with the internal mixer can be improved.

The invention claimed is:

1. An internal mixer comprising:
   a mixing chamber to which a mixing material is supplied; and
   a rotor arranged within the mixing chamber to be freely rotatable about a rotor axis, the rotor having a first axis end that is one end section of the rotor in the rotor axis direction and a second axis end that is another end section of the rotor in the rotor axis direction;
   wherein the rotor includes a plurality of mixing blades for mixing the mixing material, the plurality of mixing blades consisting of three sets of mixing blades arranged along the rotor axis direction such that the sets of mixing blades do not overlap one another in the rotor axis direction, and wherein the rotor does not possess mixing blades other than said plurality of mixing blades, wherein
   all of the blades of a first of said sets of mixing blades have the same length in the axis direction and an end coinciding with said first axis end of the rotor,
   all of the blades of a second of said sets of mixing blades have the same length in the axis direction and an end coinciding with said second axis end of the rotor,
   all of the blades of a third of said sets of mixing blades are located between said first of said sets of mixing blades and said second of said sets of mixing blades in the rotor axis direction, and do not have any end coinciding with either of said first axis end of the rotor or said second axis end of the rotor,
   all of the blades of the third of said sets of mixing blades have the same length in the axis direction and entirely coincide with one another in the rotor axis direction,
   the length of the blades of the second of said sets of mixing blades is greater than the length of the blades of the first of said sets of mixing blades, and the length of the blades of the third of said sets of mixing blades is greater than the lengths of the blades of both the first and second of said sets of mixing blades, and
   each length of all of the mixing blades of the three sets of mixing blades in the rotor axis direction is 45% or less of entire length of the entire rotor in the rotor axis direction.

2. The internal mixer according to claim 1, wherein all of the blades are linear blades as seen in a development view.

3. The internal mixer according to claim 1, further comprising two non-intermeshing rotors arranged within the mixing chamber to be rotatable in opposite directions about respective rotor axes.

* * * * *